INVENTOR
Henri MARCOUX
BY
Pierre Lesperance

PATENT AGENT

INVENTOR
Henri MARCOUX
BY Pierre Lespérance
PATENT AGENT

Feb. 2, 1965 H. MARCOUX 3,168,148
STRADDLE ROW CULTIVATOR
Filed Sept. 18, 1963 3 Sheets-Sheet 3

INVENTOR
Henri MARCOUX
BY
Pierre Lespérance

PATENT AGENT

United States Patent Office
3,168,148
Patented Feb. 2, 1965

3,168,148
STRADDLE ROW CULTIVATOR
Henri Marcoux, Beaumont, Bellechasse County,
Quebec, Canada
Filed Sept. 18, 1963, Ser. No. 309,724
1 Claim. (Cl. 172—42)

The present invention relates to an agricultural implement, and more particularly to an implement for cultivating vegetables, which is self propelled and manually controlled, and wherein means are provided for harrowing the ground and removing unwanted growth on each side of a row of plants or seeds, and between the plants or seeds of the row without disturbing the seeds or growing plants.

Cultivators are known for harrowing and weeding the ground between the rows of seeds or plants, however these cultivators are not capable of working the ground between the plants or seeds of each row.

Accordingly, the general object of the present invention resides in the provision of a self propelled cultivator which can weed and harrow the ground all around the plants of a row in a single operation and without disturbing said plants.

Another object of the present invention resides in the provision of a cultivator of the character described which is effective to perform the above noted operation despite variations in the spacing between the rows of plants.

Another object of the present invention resides in the provision of a cultivator of the character described in which the harrowing and weeding elements are all power driven, so as to effect efficient harrowing and weeding operation.

Another object of the present invention resides in the provision of a cultivator of the character described which is of light weight and sturdy construction and is relatively inexpensive to manufacture.

The foregoing and other important objects of the present invention will become more apparent during the following disclosure and by referring to the drawings, in which.

Figure 1:
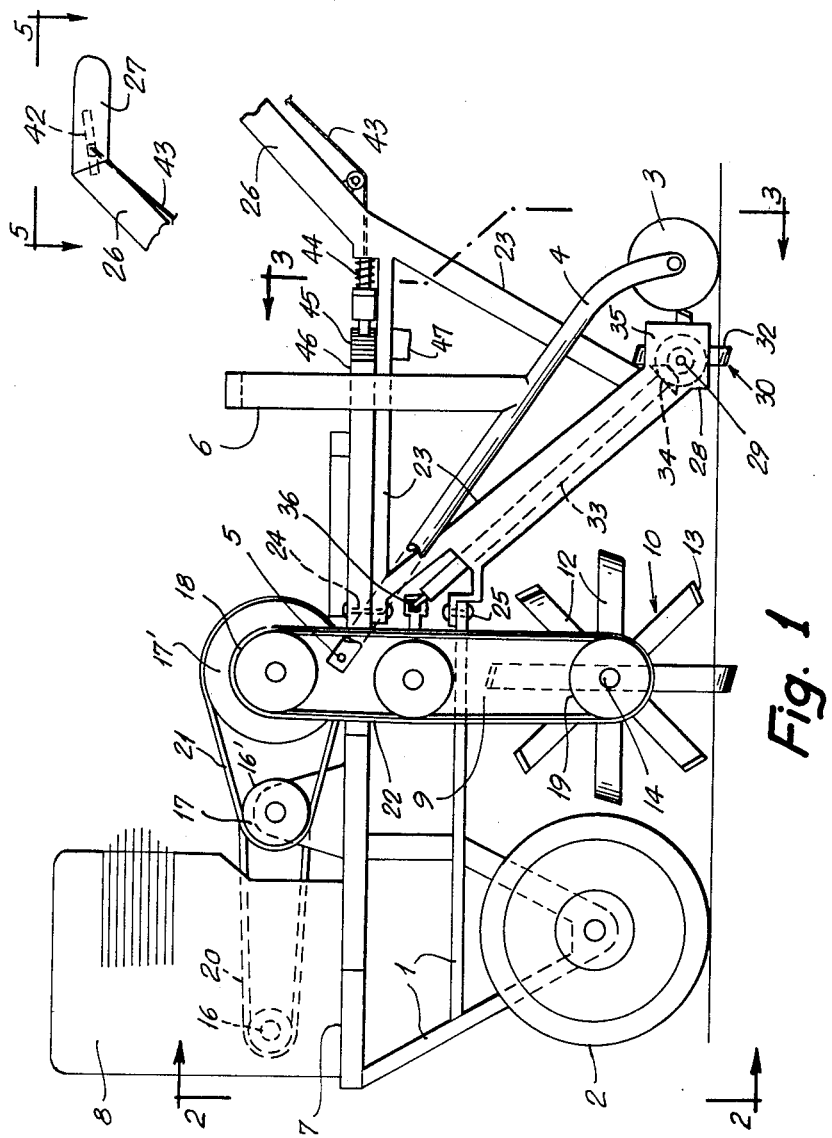
FIGURE 1 is a side elevation of the cultivator of the present invention with the operating handles partially shown.

Referring now more particularly to the drawings in which like reference characters indicate like elements throughout, the implement comprises a frame 1 supported at the front thereof by a pair of spaced ground engaging idle wheels 2, and at the back by a pair of spaced bevelled edge guiding wheels 3 which are freely rotatable at the outer ends of arms 4 downwardly and rearwardly extending from frame 1 and secured thereto at 5. Arms 4 are reinforced by a yoke member 6, the bight of which extends across and above frame 1.

Frame 1 supports a platform 7 on which is secured an internal combustion engine 8. Rigid vertically extending support arms 9 and 9' are secured to the sides of and underneath platform 7 behind idle wheels 2. A main cultivator wheel 10 is carried by the lower ends of each pair of support arms 9, and 9' one on each side of the frame 1. Each cultivator wheel 10 consists of a hub 11 supporting at each end a series of radial arms 12 bent intermediate their ends to form ground engaging extensions 13 radially spaced from hub 11 and parallel thereto. The extensions 13 of one series of arms extend in a direction opposite to the extensions of the other series of arms so as to be interdigitated. The hub 11 is keyed to a shaft 14 journaled in the lower ends of the arms 9 and 9'. The wheels 10 are laterally spaced apart and the arms 9' supporting the inner end of shafts 14 are spaced apart to leave a free space or passage 15 extending from the ground to the underside of platform 7.

The shafts 14 of cultivator wheels 10 are driven in rotation by engine 8 through pulleys 16, 16', 17, 17', 18 and 19, and belts 20, 21, 22.

A pair of vertically disposed triangular frames 23 are each pivoted at the back of frame 1 for movement about a vertical axis towards and away from each other. Each triangular frame 23 is more specifically pivoted to the back of main frame 1 by means of two vertically spaced and axially aligned pivots 24 and 25, as shown in FIGURE 1. These pivots are located at the front upper corner of the triangular frames. The back upper corner of the triangular frames 23 are extended by a rearwardly and upwardly directed control arm 26 terminated by a handle 27 at a level readily accessible to the operator walking behind the apparatus.

The lower corner of the each triangular frame 23 carries a journal box 28 in which is journaled a shaft 29 of an auxiliary smaller diameter cultivator wheel 30 which extends inwardly of its associated frame 23 and which consists of a hub 31 and radial ground engaging arms 32 having a shape similar to the arms 12 of cultivator wheels 10.

A transmission shaft 33 is located within the side of each triangular frame 23 running from the pivots 24, 25 to the journal box 28. Shaft 33 has at its lower end a bevelled pinion 34 meshing with bevelled pinion 35 which is keyed to shaft 29 of cultivator wheels 30. The upper end of driving shaft 33 protrudes from the side of triangular frame 23 which houses the same and is connected by universal joint 36 to a shaft 37 mounted in the frame 1 and provided with a bevelled pinion 38 (see FIGURE 2) meshing with a right angularly disposed bevelled pinion 39 which is keyed to a shaft 40 mounted in frame 1 and protruding from the outer side thereof wherein a pulley 41 is secured to shaft 40 and is in driving engagement with belt 22. Thus, engine 8 positively drives the cultivator wheels 30 and the driving mechanism for said wheels enable continuous rotation thereof despite their variable spacing due to the presence of the universal joint 36 located on the vertical axis joining the pivots 24 and 25 of each triangular frame 23.

Figure 2:
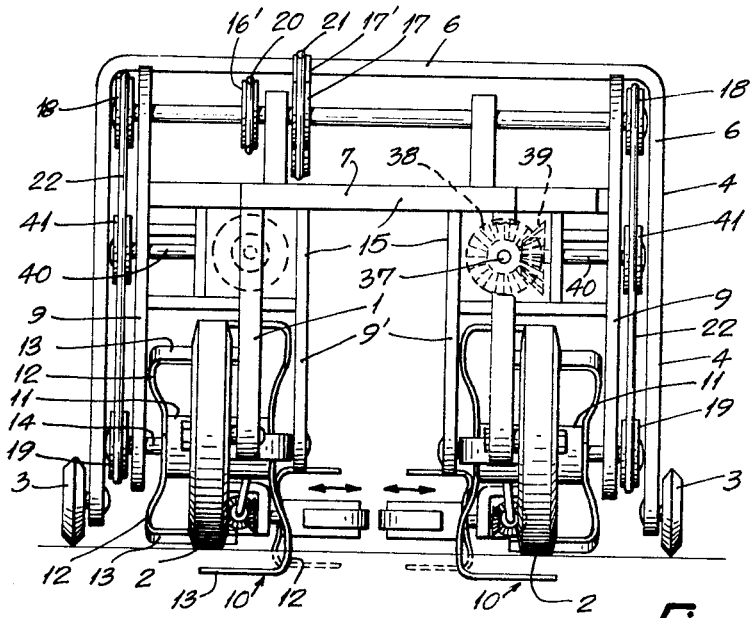
FIGURE 2 is a front view of the cultivator, the engine not being shown, said view taken along line 2—2 of FIGURE 1.
Figure 3:
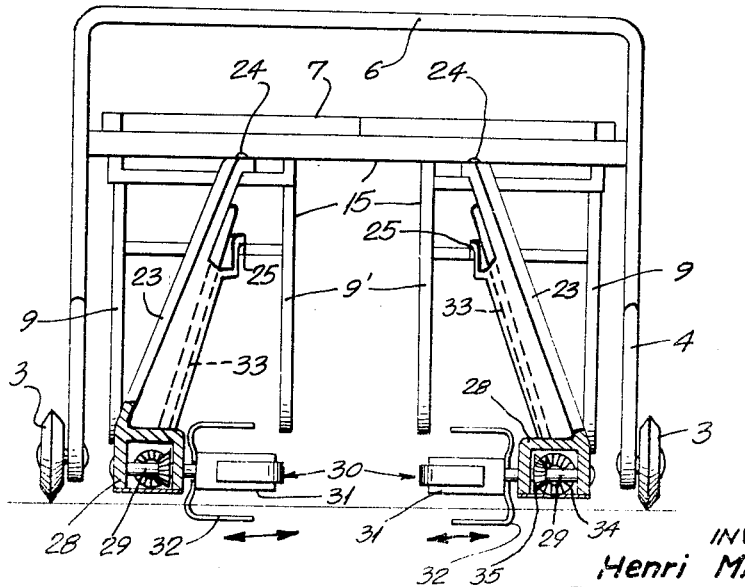
FIGURE 3 is a rear view of the same elements as that of FIGURE 2, and taken along line 3—3 of FIGURE 1.
Figure 4:
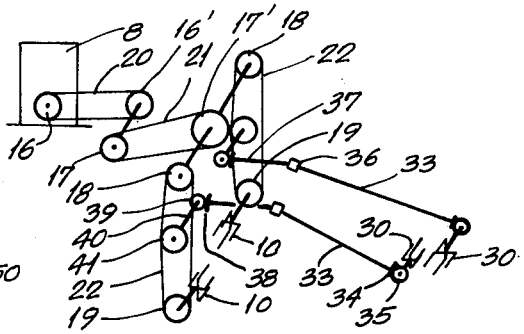
FIGURE 4 is a schematic perspective view of the driving system for the weeding and harrowing elements.

These triangular frames 23 are pivoted about their pivots 24, 25 towards or away from each other by simply approaching or spacing the handles 27. Thus, the cultivator wheels 30 which are mounted on the triangular frames 23 can take a closed position, shown in FIGURE 2, in which there are located inwardly of arms 9' within space 15 or they can take a spaced apart position, as shown in FIGURE 3, wherein said cultivator wheels 30 clear completely the space 15, being then substantially aligned with the main cultivator wheels 10.

In order to releasably lock the handles 27 and cultivator wheels 30 in any adjusted vertical angle with respect to the main axis of the implement, each handle 27 is provided with pivotable small lever 42 which upon pivoting pulls a rope or cable 43 attached thereto, said rope being attached at its other end to a spring pressed plunger 44 engageable with any one of several notches 45 made in the adjacent surface of a rack bar 46 secured to frame 1, directly over the horizontal sides of the triangular frames 23 and across the same.

Rack bar 46 together with guide bar 47 secured to bar 46 and extending underneath the horizontal side of associated frame 23 serve also to stay said frame 23 in vertical position, while allowing transverse horizontal pivotal movement of said frames 23.

Figure 7:
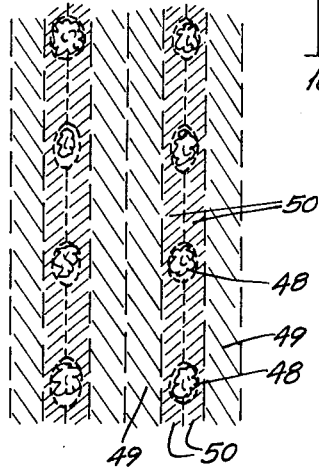
FIGURE 7 is a top plan view of two adjacent rows of plants showing the areas cultivated by the implement of the present invention.
Figure 6:
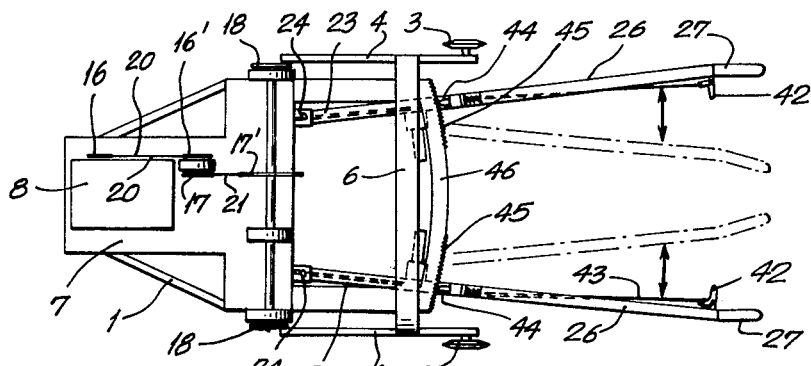
FIGURE 6 is a top plan view on a small scale of the cultivator.
Figure 5:
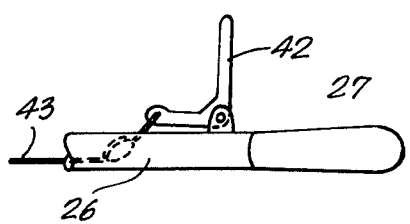
FIGURE 5 is a top plan view of one control handle, said view taken along line 5—5 of FIGURE 1.

The implement of the present invention operates as follows: Engine 8 drives the cultivator wheels 10 and 30 in a continuous rotational movement and in such a direction as to tend to advance the implement. The arms 12 and 32 of the cultivator wheels engage the ground as they extend below the idle wheels 2 and guiding wheels 3. These arms 12 and 32 effectively harrow the ground and remove the weeds. The operator operates the implement by grasping handles 27 and walking behind the implement. He guides the device such that the row of plants 48 (see FIGURE 7) will pass through space 15 defined between the two inner support arms 9', the small cultivator wheels 30 being then in a spaced apart position, as shown in FIGURE 3. Main cultivator wheel 10 and the auxiliary wheels 30, when the latter are in spaced apart position, engage the ground on each side of the row of plants 48 in the areas indicated at 49; immediately after passage of one plant 48 within space 15 and after said plant has cleared the cultivator wheels 30, the latter are immediately brought back into closed position, as shown in FIGURE 2, by approaching handles 27 and the small cultivator wheels 30 thereby harrow and weed out the ground areas 50 located between two successive plants of one row of plants 48. Thus, the cultivator wheels 30 are spread apart only for the passage of a plant 48 and the ground, not only on the sides of the row of plants but between the plants, can be cultivated. Once one row has thus been worked up, the next row can be worked up in the same manner with the cultivator wheels 30 having sufficient breadth to complete the working of the ground between the rows. Thus, the rows may be planted at variable width up to the full breadth of the cultivator wheels 10 without affecting the operation of the cultivator in accordance with the invention.

With this implement, the entire ground surrounding the plants or seeds, is completely harrowed and weeded out without disturbing the plants or seeds.

While a preferred embodiment in accordance with the invention has been illustrated and described, it is understood that various modifications may be resorted to without departing from the spirit and scope of the appended claim.

What I claim is:

A cultivator comprising a main frame defining a passage in the center thereof for plants, main cultivator wheels rotatably mounted on said main frame on each side of said passage, a pair of auxiliary frames pivotally connected to said main frame about vertical pivot axes for pivotal movement of said auxiliary frames towards and away from each other in a horizontal path, each auxiliary frame having a control handle extending rearwardly therefrom and rigid therewith, each auxiliary frame carrying a rotatable auxiliary cultivator wheel extending inwardly therefrom at the lower end thereof, said main and auxiliary cultivator wheels each consisting of a hub and of a plurality of radially outwardly projecting arms carried by said hub and adapted to directly engage the ground for working the same, said auxiliary cultivator wheels having a smaller diameter and a smaller breadth than said main cultivator wheels, power means mounted on said main frame and driving mechanism connected to said power means and both to said main cultivator wheels and to said auxiliary cultivator wheels, said auxiliary cultivator wheels movable laterally of said main frame between a close contiguous position extending in the path of said passage and a spaced apart position fully clearing said passage upon pivotal movement of said auxiliary frames, said auxiliary frames each consisting of a triangular frame having a horizontally disposed side spaced above ground, the front end of said horizontal side being pivotally connected to said main frame by two vertically spaced axially aligned vertical pivotal connections, said control handle extending from the opposite end of said horizontal side, a journal box formed at the lower apex of said triangular frame, said auxiliary cultivator wheel journaled in said journal box, said driving mechanism including a transmission shaft extending through the side of said triangular frame extended between said journal box and said pivotal connections, said transmission shaft drivingly connected to its associated auxiliary cultivator wheel, a connector shaft mounted in said main frame, and a universal joint connecting said connector shaft and said transmission shaft, said joint located on the axis joining the said two pivotal connections.

References Cited by the Examiner

UNITED STATES PATENTS

| | | | |
|---|---|---|---|
| 620,046 | 2/99 | Morrison et al. | 172—99 X |
| 878,373 | 2/08 | Gauntt | 172—99 |
| 1,612,823 | 1/27 | Keese. | |
| 1,843,095 | 1/32 | Urschel | 172—42 |
| 1,959,942 | 5/34 | Avignon | 172—99 X |
| 2,375,137 | 5/45 | Rutishauser | 172—43 |
| 2,959,231 | 11/60 | Heilman | 172—42 |

FOREIGN PATENTS

| | | |
|---|---|---|
| 138,027 | 7/50 | Australia. |
| 822,611 | 9/37 | France. |
| 338,258 | 6/21 | Germany. |

ABRAHAM G. STONE, *Primary Examiner.*